(12) United States Patent
Iwasaki et al.

(10) Patent No.: US 10,968,507 B2
(45) Date of Patent: Apr. 6, 2021

(54) SPRAYED COATING, METHOD FOR MANUFACTURING SPRAYED COATING, SPRAYED MEMBER AND SPRAYING MATERIAL

(71) Applicant: Shin-Etsu Chemical Co., Ltd., Tokyo (JP)

(72) Inventors: Ryo Iwasaki, Echizen (JP); Noriaki Hamaya, Echizen (JP); Yasushi Takai, Echizen (JP); Hajime Nakano, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/539,165

(22) Filed: Aug. 13, 2019

(65) Prior Publication Data
US 2020/0056278 A1    Feb. 20, 2020

(30) Foreign Application Priority Data

Aug. 15, 2018    (JP) .............................. JP2018-152883

(51) Int. Cl.
*C23C 4/11*    (2016.01)
*C23C 4/134*    (2016.01)

(52) U.S. Cl.
CPC ................ *C23C 4/11* (2016.01); *C23C 4/134* (2016.01)

(58) Field of Classification Search
CPC ........... C23C 4/11; C23C 4/134; C23C 28/00; C23C 28/042; C23C 4/04
See application file for complete search history.

(56) References Cited

U.S. PATENT DOCUMENTS

| 2002/0015853 A1* | 2/2002 | Wataya | C01F 17/265 428/469 |
| 2015/0307715 A1* | 10/2015 | Sato | C09D 1/00 106/287.26 |
| 2017/0088930 A1* | 3/2017 | Ibe | C23C 4/134 |
| 2017/0278609 A1* | 9/2017 | Hagiwara | H02K 1/04 |

FOREIGN PATENT DOCUMENTS

| JP | 4985928 B2 | 7/2012 |
| JP | 5987097 B2 | 9/2016 |
| JP | 2017-61734 A | 3/2017 |
| JP | 2017-78205 A | 4/2017 |
| JP | 2017-186678 A | 10/2017 |
| JP | 2017-190475 A | 10/2017 |

* cited by examiner

*Primary Examiner* — Nathan L Van Sell
(74) *Attorney, Agent, or Firm* — Westerman, Hattori, Daniels & Adrian, LLP

(57) ABSTRACT

A sprayed coating having a multilayer structure including a lower layer made a sprayed coating containing a rare earth oxide, and a surface layer made of another sprayed coating containing a rare earth fluoride and/or a rare earth oxyfluoride, the multilayered sprayed coating having a volume resistivity at 23° C. and a volume resistivity at 200° C., the volume resistivity at 23° C. being $1 \times 10^9$ to $1 \times 10^{12}$ Ω·cm, and a temperature index of the volume resistivities defined by the ratio of the volume resistivity at 200° C. to the volume resistivity at 23° C. being 0.1 to 10.

23 Claims, 2 Drawing Sheets

FIG.1

PHOTOGRAPHIC IMAGE FOR ANALYSIS OF THE CROSS-SECTION SURFACE IN THE SPRAYED COATING MANUFACTURED IN EXAMPLE 3 IN WHICH THE SURFACE LAYER WAS FORMED WITH ADDING A SMALL AMOUNT OF YTTRIUM OXIDE FINE PARTICLES

FIG.2

PHOTOGRAPHIC IMAGE FOR ANALYSIS OF THE CROSS-SECTION SURFACE IN THE SPRAYED COATING MANUFACTURED BY THE SAME METHOD OF EXAMPLE 3 WITHOUT ADDING YTTRIUM OXIDE FINE PARTICLES

SPRAYED COATING, METHOD FOR MANUFACTURING SPRAYED COATING, SPRAYED MEMBER AND SPRAYING MATERIAL

CROSS-REFERENCE TO RELATED APPLICATION

This non-provisional application claims priority under 35 U.S.C. § 119(a) on Patent Application No. 2018-152883 filed in Japan on Aug. 15, 2018, the entire contents of which are hereby incorporated by reference.

TECHNICAL FIELD

This invention relates to a sprayed coating suitable for such as an erosion-resistant coating formed on electrostatic chucks, or parts or members in a plasma etching apparatus for a semiconductor manufacturing process. This invention also relates to a method for manufacturing the sprayed coating, a sprayed member formed the sprayed coating, and a spraying material suitably used for forming the sprayed coating.

BACKGROUND ART

An electrostatic chuck use for a lower electrode in a semiconductor manufacturing apparatus is generally categorized to two types of a Coulomb force type electrostatic chuck and a Johnson-Rahbek force type electrostatic chuck, in accordance with the difference between materials. For a Coulomb force type electrostatic chuck, a sintered ceramic such as aluminum oxide and aluminum nitride with high purity is commonly utilized such that a dielectric layer portion has a volume resistivity of over $1 \times 10^{15}$ $\Omega \cdot cm$. Thus, this type has an issue of high production cost. Further, a Coulomb force type electrostatic chuck must be applied a high voltage of about 2,000 to 3,000 V for ensuring sufficient adsorption power because charge transfer is scarcely occurred in the Coulomb force type electrostatic chuck.

For a Johnson-Rahbek force type electrostatic chuck, a sintered ceramic such as aluminum oxide and aluminum nitride in which an additive such a metal oxide is doped is commonly utilized such that a dielectric layer portion has a volume resistivity of about $1 \times 10^9$ to $1 \times 10^{12}$ $\Omega \cdot cm$. This type also has an issue of high production cost. Further, in a Johnson-Rahbek force type electrostatic chuck, it is required that the material has a low temperature dependency since the adsorption property depends to volume resistivity.

In addition, a processing object (semiconductor) is treated under high corrosive halogen series gas atmosphere in a plasma etching apparatus. Fluorine series gas and chlorine series gas are utilized as the gas for the treatment. Examples of the fluorine series gas include $SF_6$, $CF_4$, $CHF_3$, $ClF_3$, $HF$ and $NF_3$, and examples of the chlorine series gas include $Cl_2$, $BCl_3$, $HCl$, $CCl_4$ and $SiCl_4$.

On the surface of parts or members of which a plasma etching apparatus is composed, an erosion-resistant coating is generally formed by atmospheric plasma spraying (APS) which supplies rare earth compound as a raw material in form of particulate. Further, in case that a reaction product deposited or attached on the surface of the member by halogen series gas plasma is removed by a cleaning solution, Patent Document 1 proposes to suppress, by a coating having a multilayer structure, a dissolving amount of a substrate caused by infiltration of an acid generated from a reaction of the reaction product and the cleaning solution. As another matter, an average particle size of the spraying particles is preferably at least 10 μm to spray in form of particulate. If the size is less than the range, flowability of the particles may become low, resulting a supply tube being clogged with the sprayed material, or the particle introduced in a flame may vaporize, resulting deterioration of process yield (Patent Document 2). Accordingly, a sprayed coating obtained by thermal spraying with particles having a large average particle size results in many cracks and a large porosity because the splat diameter of the particle is large. Thus, a dense coating cannot be obtained, and particles generates adversely from the coating in etching process. For example, when a yttrium fluoride series sprayed coating which has a good erosion resistance to halogen series gas plasma is formed by APS, initial generation of particles are suppressed in comparison with a yttrium oxide sprayed coating formed by APS. However, the yttrium fluoride series sprayed coating has a Vickers hardness of 350 to 470 and a porosity of approx. 2% (in Patent Document 3) which do not necessarily mean enough properties.

Particularly, integration of a semiconductor is in progress, recently, and will be expected to reach to a width of wiring of up to 10 nm. The above yttrium series coating is easy to drop yttrium series particles from the surface of the yttrium series coating of the parts when the integrated semiconductor devices is processed by etching, and the released particles are dropped readily on a wafer and prevent the etching treatment. These particles may cause deterioration of process yield in manufacturing semiconductor devices. Thus, it is required that an erosion-resistant coating formed on a member which constitutes a chamber exposed to a plasma has a further high erosion resistibility.

Recently, a suspension plasma spraying (SPS) is investigated to solve the above-described problems. In SPS, spraying particles are not sprayed as a particulate form but are sprayed as a slurry form in which the spraying particles are dispersed in a dispersion medium. When thermal spraying is conducted with a slurry form, fine particles having a particle size of up to 10 μm that is difficult to apply for thermal splaying with a particulate form can be introduced to a flame of thermal spraying. Thus, the obtained sprayed coating is very dense since splat diameter of the sprayed coating becomes very small.

For example, a thermal spraying method using a slurry in which yttrium oxide particles are dispersed in a medium is known as a method in which particles are splayed in a slurry form. The method can prepare a dense sprayed coating having a Vickers hardness of at least 500 and a porosity of up to 1% (Patent Document 4). However, even if the sprayed coating is dense, the yttrium oxide has a problem such that a sprayed coating of yttrium oxide can be progressively halogenated at its surface by chemical reaction of yttrium oxide and halogen series gas plasma, and many yttrium series particles are generated as unfavorable particles source.

To deal with the problem, a sprayed coating obtained from a slurry in which yttrium fluoride or yttrium oxyfluoride spraying particles are dispersed in a medium is proposed, however, a dense sprayed coating that can satisfy current needs has not been formed in this method (Patent Documents 5 and 6).

CITATION LIST

Patent Document 1: JP-B 4985928
Patent Document 2: JP-A 2017-186678
Patent Document 3: JP-A 2017-190475

Patent Document 4: JP-B 5987097
Patent Document 5: JP-A 2017-61734
Patent Document 6: JP-A 2017-78205

DISCLOSURE OF INVENTION

An object of the invention is to provide a method that can prepare a dense sprayed coating suitable for an electrostatic chuck in a plasma etching apparatus that is hard to generate particles by halogen series gas plasma that and has a low temperature dependency of volume resistivity, and a sprayed coating suitable for an erosion-resistant coating formed on parts or members in a plasma etching apparatus. Further, another object of the invention is to provide a method of manufacturing the sprayed coating, a sprayed member in which the sprayed coating is formed, and a spraying material suitably used for forming a sprayed coating.

The inventors have found that a sprayed coating having a multilayer structure including a lower layer made of a sprayed coating containing a rare earth oxide, and a surface layer made of another sprayed coating containing a rare earth fluoride and/or a rare earth oxyfluoride formed on the lower layer has a low temperature dependency of volume resistivity and superior electric characteristics, in particular, has a good volume resistivity at 23° C. being $1 \times 10^9$ to $1 \times 10^{12}$ Ω·cm, and a temperature index of the volume resistivities defined by a ratio of the volume resistivity at 200° C. to the volume resistivity at 23° C. being 0.1 to 10 by adjusting thicknesses of each layers, porosity, hardness and/or surface roughness. Further, thicknesses of the surface and lower layers, hardness of the coating, porosity of the coating, and surface roughness of the coating are repeatedly investigated, then, the invention has been accomplished.

In one aspect, the invention provides a sprayed coating having a multilayer structure including a lower layer made of a sprayed coating containing a rare earth oxide, and a surface layer made of another sprayed coating containing a rare earth fluoride and/or a rare earth oxyfluoride, wherein
the sprayed coating having the multilayer structure has a volume resistivity at 23° C. and a volume resistivity at 200° C., the volume resistivity at 23° C. being $1 \times 10^9$ to $1 \times 10^{12}$ Ω·cm, and a temperature index of the volume resistivities defined by the ratio of the volume resistivity at 200° C. to the volume resistivity at 23° C. being 0.1 to 10.

Preferably, the surface layer contains $RF_3$, or $RF_3$ and at least one selected from the group consisting of $R_5O_4F_7$, $R_7O_6F_9$ and ROF, wherein R is at least one selected from rare earth elements inclusive of Y and Sc, and each R may be the same or different.

Preferably, the lower layer contains $R_2O_3$, or $R_2O_3$ and at least one selected from the group consisting of $RF_3$, $R_5O_4F_7$, $R_7O_6F_9$ and ROF, wherein R is at least one selected from rare earth elements inclusive of Y and Sc, and each R may be the same or different.

Preferably, the lower layer has a multilayer structure consisting of at least two sub-layers of sprayed coatings, and at least one of the sub-layer consists of a sprayed coating containing a rare earth oxide.

Preferably, the lower layer has a thickness of 50 to 300 μm, and the surface layer has a thickness of 10 to 200 μm.

Preferably, the surface layer has a Vickers hardness of at least 500, a porosity of up to 1%, and/or a centerline average roughness Ra of 0.1 to 6 μm.

In another aspect, the invention provides a sprayed member including a metal substrate, a ceramic substrate or a carbon substrate, and the sprayed coating formed thereon.

Preferably, the metal substrate is composed of an aluminum alloy, an anodized aluminum alloy or a stainless steel, the ceramic substrate is composed of alumina, zirconia, quartz glass, silicon carbide or silicon nitride.

In another aspect, the invention provides a method for manufacturing the sprayed coating including the steps of:
thermal spraying a rare earth oxide powder on a substrate to form the lower layer by atmospheric plasma spraying, and
thermal spraying a slurry including an organic solvent and a rare earth fluoride powder dispersed therein on the lower layer to form the surface layer by suspension plasma spraying.

Preferably, the slurry further includes a rare earth oxide powder, and a weight ratio of fluoride powder/oxide powder is 99/1 to 90/10.

In another aspect, the invention provides a method for manufacturing the sprayed coating including the steps of:
thermal spraying a rare earth oxide powder on a substrate to form the lower layer by atmospheric plasma spraying, and
thermal spraying a powder containing rare earth fluoride and a rare earth oxide to the lower layer to form the surface layer by atmospheric plasma spraying.

In another aspect, the invention provides a spraying material in a form of a slurry including an organic solvent and a rare earth compound powder dispersed therein, the rare earth compound powder including an $RF_3$ powder, and R being at least one selected from rare earth elements inclusive of Y and Sc.

Preferably, the $RF_3$ powder has a BET specific surface area of up to 2 m²/g, and a volume basis average particle size $D_{50}$ of 2 to 6 μm.

Preferably, the $RF_3$ powder has an average value of roundnesses of at least 0.9, the roundness being defined by the following expression (1):

(Roundness)=(Circumferential length of an assumed circle having the equivalent area in planar view to an area of an observed particle)/(Circumferential length of the observed particle in planar view) (1)

Preferably, the $RF_3$ powder has a particle hardness of 7 to 12 GPa as measured by nanoindentation method.

Preferably, the $RF_3$ powder has a total volume of pores having a diameter of up to 10 μm in the range of up to 0.5 cm³/g as measured by mercury porosimetry.

Preferably, the spraying material further including an $R_2O_3$ powder, R being at least one selected from rare earth elements inclusive of Y and Sc, and a weight ratio of $RF_3$ powder/$R_2O_3$ powder is 99/1 to 90/10.

Advantageous Effects of Invention

According to the inventive sprayed coating having a multilayer structure including a lower layer containing a rare earth oxide and a surface layer containing a rare earth fluoride and/or a rare earth oxyfluoride, the sprayed coating has a small variation of volume resistivities from a room temperature to 200° C., and good electric characteristics having a low temperature dependency, and exerts superior erosion-resistance in a treatment under halogen series gas atmosphere or halogen series gas plasma atmosphere. Further, the sprayed coating can accomplish reduced generation of particles that are dropped from a reaction product or a coating as much as possible. Moreover, the sprayed coating can be readily obtained by the method and spraying material of the invention.

DESCRIPTION OF PREFERRED EMBODIMENTS

A sprayed coating of the invention has a multilayer structure including a lower layer made of a sprayed coating containing a rare earth oxide, and a surface layer made of another sprayed coating containing a rare earth fluoride and/or a rare earth oxyfluoride (a rare earth fluoride series coating). In the present invention, the rare earth element includes Sc, Y and lanthanoid (La: atomic number 57 to Lu: atomic number 71). The rare earth element is used alone or a combination of two or more elements.

The sprayed coating containing a rare earth fluoride and/or a rare earth oxyfluoride for forming the surface layer may be a sprayed coating containing $RF_3$, or a sprayed coating containing $RF_3$, and at least one selected from the group consisting of $R_5O_4F_7$, $R_7O_6F_9$ and ROF, wherein, R is, independently, at least one element selected from rare earth elements inclusive of Y and Sc, and R may be the same or different. In this case, the rare earth fluoride and/or the rare earth oxyfluoride preferably has a crystal structure including $RF_3$, and at least one selected from the group consisting of $R_5O_4F_7$, $R_7O_6F_9$ and ROF in view of erosion-resistance to halogen series gas atmosphere or halogen series gas plasma atmosphere, however, not limited thereto.

In particular, as the rare earth element, Sc, Y, La, Ce, Pr, Nd, Pm, Sm, Eu, Gd, Tb, Dy, Ho, Er, Tm, Yb and Lu are exemplified. Among them, Y, Gd, Tb, Dy, Ho, Er, Tm, Yb and Lu are preferable, however, not limited thereto.

The surface layer preferably has a thickness of 10 to 200 μm, more preferably 50 to 150 μm, even more preferably 80 to 120 μm, however, not limited thereto. If the thickness of the surface layer is less than 10 μm, the surface layer may not exert a sufficient erosion-resistance to halogen series gas plasma. On the other hand, if the thickness is more than 200 μm, the surface layer may be adversely peeled from the lower layer.

The surface layer preferably has a Vickers hardness of at least 500, more preferably 500 to 700. If the Vickers hardness is less than 500, the sprayed coating may readily generate particles from its surface by halogen series gas plasma in some cases. On the other hand, if the Vickers hardness is more than 700, the coating of the surface layer may be adversely peeled from the coating of the lower layer.

To control generation of particles by halogen series gas plasma and to improve erosion-resistance, the sprayed coating forming the surface layer preferably a dense coating having a porosity of preferably up to 1%, more preferably up to 0.5%, however, not limited thereto. A method for measuring the porosity includes, for example, as described in Examples and Comparative Examples, taking cress-section photo images by an electron microscope, quantifying the porosity of the total area of the image in a plurality of views (10 views in Examples and Comparative Examples), determining an average of the porosities of the plurality of views expressed by percentage as the porosity.

As described above, a surface layer formed of a hard and dense sprayed coating having a Vickers hardness of at least 500, more preferably 500 to 700 and a porosity of less than 1% can effectively control generation of particles and interfusion of halogen series corrosive gases when the sprayed coating is used in halogen series gas atmosphere or halogen series gas plasma atmosphere.

The coating forming the surface layer preferably has a centerline average roughness Ra (defined in JIS B 0601) of 0.1 to 6 μm, more preferably 0.1 to 5.5 μm, even more preferably 0.1 to 5 μm, however, not limited thereto. If the centerline average roughness Ra is more than 6 μm, generation of particles by s halogen series gas plasma is adversely accelerated. On the other hand, if the centerline average roughness Ra is less than 0.1 μm, the sprayed coating may be adversely damaged by excessive machining for adjusting the thickness, or particles are inexpediently dropped from the coating.

The surface layer of a sprayed coating containing a rare earth fluoride is formed on a lower layer which is described below. As a method for forming the surface layer, for example, suspension plasma spraying (SPS) method using a slurry including a rare earth fluoride powder, or atmospheric plasma spraying (APS) method using a rare earth fluoride powder is applied. In particular, SPS method is preferably applied to form the surface layer since the method can easily form a dense sprayed coating having a Vickers hardness and a porosity in the preferably ranges described above.

As a slurry for use in suspension plasma spraying (SPS) method for forming the surface layer, a slurry including an organic solvent as a dispersion medium and a rare earth compound powder including a rare earth fluoride powder (a $RF_3$ powder, wherein R is at least one element selected from rare earth elements inclusive of Y and Sc) dispersed therein is preferably used. In this case, the organic solvent includes, e.g., alcohols, ethers, esters and ketones, however, not limited thereto. Among them, ethanol, methanol, 1-propanol, 2-propanol, ethyl cellosolve, dimethyl diglycol, glycol ether, ethyl cellosolve acetate, butyl cellosolve acetate glycol ester, isophorone or acetone is more preferably used. A content of the $RF_3$ powder in the slurry is preferably 10 to 45 wt %, more preferably 20 to 35 wt %, however not limited thereto. Further, the dispersion medium of which the slurry is composed may contain a small amount of water other than the organic solvent (e.g., up to 10 wt %, preferably up to 5 wt %, to the amount of the organic solvent). More preferably, the dispersion medium of which the slurry is composed consists essentially of an organic solvent alone, however, an impurity may be contained therein in relevant amount.

The $RF_3$ powder dispersed in the slurry preferably has a BET specific surface area of up to 2 $m^2/g$, more preferably up to 1.5 $m^2/g$, even more preferably up to 1 $m^2/g$, most preferably up to 0.8 $m^2/g$, and preferably at least 0.1 $m^2/g$. The $RF_3$ powder dispersed in the slurry preferably has a volume basis average particle size $D_{50}$ of 2 to 6 μm, more preferably 2.5 to 5 μm. The $RF_3$ powder dispersed in the slurry preferably has a particle hardness of 7 to 12 GPa, more preferably 7.5 to 11.5 GPa, as measured by nanoindentation method. The $RF_3$ powder dispersed in the slurry preferably has a total volume of pores having a diameter of up to 10 μm in the range of up to 0.5 $cm^3/g$, more preferably up to 0.4 $cm^3/g$, as measured by mercury porosimetry. The $RF_3$ powder dispersed in the slurry preferably has an average value of roundnesses (average roundness) of at least 0.9, defined by the following expression (1):

(Roundness)=(Circumferential length of an assumed circle having the equivalent area in planar view to an area of an observed particle)/(Circumferential length of the observed particle in planar view)     (1)

Notably, for example, when a spraying particle has a perfect circular shape in planar view, the average roundness is 1 (one), and when a spraying particle has a square shape in planar view, the average roundness is 0.886. Accordingly, the average roundness increases as the shape in planar view of the spraying particle approaches to perfect circular shape, and the average roundness decreases as the shape in planar view of the spraying particle becomes more complicated shape. However, the $RF_3$ powder is not limited to the above-described features.

The dense surface layer having a Vickers hardness of at least 500, particularly 500 to 700 and a porosity of up to 1% can be formed by preparing a slurry with a $RF_3$ powder satisfying the BET specific surface area, the average particle size $D_{50}$, the average roundness, the particle hardness and/or the volume of pores, and forming the surface layer by suspension plasma spraying (SPS) method.

The slurry may include fine particles composed of one or more materials selected from the group consisting of inorganic compounds, polymers, nonmetals, metalloids and nonferrous metals, as an additive in the range of up to 10 wt %. Thermal characteristics, electrical characteristics, and mechanical characteristics of the sprayed coating (surface layer) can be controlled by the addition of an extremely small amount of the fine particles.

As the inorganic compound, a compound including one or more selected from the group consisting of oxides, nitrides, carbides, haloids, hydroxides, carbonates, ammonium salts, oxalates, nitrates, sulfates and hydrochloride salts, of rare earth elements, boron, aluminum, gallium, indium, beryllium, magnesium, calcium, strontium, barium, titanium, zirconium, hafnium, silicon, germanium, tin, lead, phosphorus or sulfur is exemplified, however no limited thereto.

As the polymer, polysilanes, polycarbosilanes, polysiloxanes, polyborosiloxanes, polysilazanes, polyorganoborosilazanes, polycarbosilazanes, polycarbonates, and the like are exemplified, however no limited thereto.

As the nonmetal and metalloid, carbon, boron, silicon, germanium, phosphorus, sulfur, and the like are exemplified, however no limited thereto.

As the nonferrous metal, rare earth elements, aluminum, gallium, indium, beryllium, magnesium, calcium, strontium, barium, titanium, zirconium, hafnium, tin, lead, and the like are exemplified, however no limited thereto. The nonferrous metal may be an alloy of the metal.

The slurry may be added with a small amount of an oxide powder of rare earth element (a $R_2O_3$ powder, wherein R is at least one element selected from rare earth elements inclusive of Y and Sc) in the range of 99/1 to 90/10 (weight ratio) being defined as the ratio of the $RF_3$ powder to the $R_2O_3$ powder, however not limited thereto. In this case, the rare earth element of the $R_2O_3$ powder is preferably the same rare earth element of the $RF_3$ powder. The added $R_2O_3$ powder preferably has a BET specific surface area of 30 to 80 $m^2/g$, more preferably 40 to 60 $m^2/g$, and preferably has a volume basis average particle size $D_{50}$ of 10 to 500 nm, more preferably 50 to 300 nm, however not limited thereto, and such fine particles is suitably as the $R_2O_3$ powder. Generation of lateral cracks in the surface layer can be effectively controlled by adding a small amount of such a powder of $R_2O_3$ fine particles to the slurry, as shown in Example 3 described below.

In addition, the slurry is suitably used as a spraying material for forming the surface layer of the multilayered sprayed coating of the invention, however, the slurry is not limited to this application. The slurry may be used as a slurry for forming a single layered sprayed coating or a sprayed coating of which a multilayered coating other than the invention is composed.

The surface layer of which the sprayed coating of the invention is composed may be formed, as described above, by atmospheric plasma splaying with a rare earth fluoride powder. In this case, a powder containing a fluoride and an oxide of rare earth element can be provided to atmospheric plasma splaying by, for example, mixing a predetermined amount of a rare earth fluoride powder (a $RF_3$ powder) with a predetermined amount of a rare earth oxide powder (a $R_2O_3$ powder), and optionally granulating the mixture. However, the powder is not limited thereto. A sprayed coating containing $RF_3$, and at least one selected from the group consisting of $R_5O_4F_7$, $R_7O_6F_9$ and ROF, wherein R is at least one selected from rare earth elements inclusive of Y and Sc, and each R may be the same or different, can be obtained by the method. In this case, a content of the added rare earth oxide may be preferably 1 to 50 wt %, more preferably 5 to 30 wt % of the total amount of the spraying powder. The powder containing a fluoride and an oxide of rare earth element preferably has a volume basis average particle size $D_{50}$ of 15 to 45 μm, more preferably 20 to 40 μm.

The spraying conditions such as plasma gases, spray gun output, spraying distance, and the like may be set in accordance with material and/or size (spraying area) of a substrate, and/or type and/or thickness of a sprayed coating in any cases of suspension plasma spraying and atmospheric plasma spraying.

The sprayed coating of the invention has a multilayer structure in which the surface layer is formed on the lower layer composed of a sprayed coating containing a rare earth oxide.

The sprayed coating containing a rare earth oxide of which the lower layer is composed may be a sprayed coating containing $R_2O_3$, or a sprayed coating containing $R_2O_3$, and at least one selected from the group consisting of $RF_3$, $R_5O_4F_7$, $R_7O_6F_9$ and ROF, wherein R is at least one selected from rare earth elements inclusive of Y and Sc, and each R may be the same or different.

In this case, Sc, Y, La, Ce, Pr, Nd, Pm, Sm, Eu, Gd, Tb, Dy, Ho, Er, Tm, Yb and Lu are exemplified as the rare earth element R, however, not limited thereto. Among them, as same as the surface layer, Y, Gd, Tb, Dy, Ho, Er, Tm, Yb and Lu are preferable.

The lower layer preferably has a thickness of 50 to 300 μm, more preferably 70 to 200 μm, even more preferably 80 to 150 μm, however not limited thereto. If the thickness of the lower layer is less than 50 μm, an elution amount of the substrate caused by an acid may be increase. On the other hand, if the thickness is more than 200 μm, the lower layer may be adversely peeled from the substrate.

Since the surface roughness of sprayed coating forming the lower exerts an influence on the surface roughness of the surface layer, a small surface roughness is advantageous for the lower layer. The coating forming the lower layer preferably has a centerline average roughness Ra (defined in JIS B 0601) of 0.1 to 10 μm, more preferably 0.1 to 6 μm, however, not limited thereto. After forming the sprayed coating of the lower layer by atmospheric plasma spraying, the surface roughness may be adjusted to the above range by, for example, conducting optionally mechanical polishing (surface grinding, inner cylinder finishing, mirror finishing, and the like), blast treatment using micro beads, or hand polishing using a diamond pad, Further, as the same reason for the surface layer, the coating forming the lower layer preferably has a porosity of up to 5%, more preferably up to 3%, however, not limited thereto. The porosity can be attained by the following method, however, not limited thereto.

For example, a lower layer made of a dense sprayed coating composed of a rare earth oxide having a porosity of up to 5% can be formed by atmospheric plasma spraying, explosion spraying, and the like with a powder of single particles or a granulated spraying powder, as a raw material for the rare earth oxide, that has a volume basis average particle size $D_{50}$ of 0.5 to 50 µm, more preferably 1 to 30 µm, with melting the particles sufficiently. Since the powder of single particles which is used for a spraying material is fine particles having a smaller particle size and consisting of particles filled with the content, in comparison with a general granulated spraying powder, the method can form a lower layer that includes a splat having a small diameter and control generation of cracks. According to the effect, a sprayed coating having a porosity of up to 5% and a small centerline average roughness Ra can be obtained. The powder of single particles, herein, means a powder having a spherical shape, a powder having an angular shape, a pulverized powder, and the like, and the particle is solidly filled with the content.

The lower layer may have a multilayer structure in which at least two sprayed coatings are laminated. In this case, at least one sub-layer which constitutes the multilayer structure is the above-described sprayed coating containing a rare earth oxide for the lower layer. Further, in this case, a sprayed coating containing a rare earth fluoride is exemplified as other layer laminated with the sprayed coating containing a rare earth oxide, however not limited thereto. In particular, as described below in Example 6, a double layer structure including a $Y_2O_3$ sprayed coating and a $YF_3$ sprayed coating laminated thereon may be obtained by forming a sprayed coating of a rare earth oxide by atmospheric plasma spraying of a yttrium oxide powder on the surface of a substrate, and forming a sprayed coating of a rare earth fluoride by atmospheric plasma spraying of a yttrium fluoride powder thereon.

As a method for forming the lower layer, atmospheric plasma spraying is preferably applied, as described in Examples below, however, not limited thereto.

The sprayed coating of the invention is a coating having a multilayer structure including the lower layer formed on the surface of a substrate, and the surface layer laminated on the lower layer. The sprayed coating exerts superior electric characteristics by the multilayer structure. In particular, the sprayed coating has a volume resistivity at 23° C. being $1\times10^9$ to $1\times10^{12}$ Ω·cm which is good electrical resistant ability, and variation of the volume resistivity in the temperature range from 23 to 200° C. of the sprayed coating is very small. In particular, a sprayed coating having a temperature index of the volume resistivities defined by the ratio of the volume resistivity at 200° C. to the volume resistivity at 23° C. being 0.1 to 10 can be provided, and the sprayed coating is extremely stable in electric characteristics.

In the invention, since the sprayed coating has a multilayer structure including a lower layer and a surface layer, the temperature index of volume resistivities can be arbitrarily controlled with variation of thicknesses of the lower and/or surface layers, or variation of oxygen content of rare earth fluoride series coating of the surface layer. For example, a material having a small variation of the volume resistivity between a room temperature and the high temperature of 200° C. is required for an electrostatic chuck used in a plasma etching apparatus. The invention can provide a material satisfying the requirement.

Further, the sprayed coating of the invention, as described in Examples below, has a stable surface resistivity enough, and a sufficiently high dielectric breakdown strength, thus, a good dielectric breakdown voltage value that is applicable to material of an electrostatic chuck is attained by the sprayed coating.

The sprayed coating of the invention is suitable for an erosion-resistant coating that is formed on an electrostatic chuck, or a part or a member in a plasma etching apparatus for use in semiconductor manufacturing process, however, not limited thereto. The sprayed coating is applicable for a substrate having e.g., a flat plate shape or a cylindrical shape, and composed of a heat-resistant material, for example, a metal such as an aluminum alloy, an alumite-treated aluminum alloy and a stainless steel, a ceramic such as alumina, zirconia, quartz glass, silicon carbide and silicon nitride, carbon, and the like.

EXAMPLES

Examples of the invention are given below by way of illustration and not by way of limitation.

Example 1

An A5052 aluminum alloy substrate having the surface size of 100 mm square and 5 mm thick was degreased at the surface by acetone, and one surface of the substrate was subjected to roughening treatment with an abrasive corundum. A yttrium oxide sprayed coating of 100 µm thick was formed as a lower layer on the substrate by using an atmospheric plasma spraying apparatus with a yttrium oxide powder (granulated particles) having an average particle size ($D_{50}$) of 20 µm. As spraying conditions, argon gas and hydrogen gas were used as plasma gases, and output of 30 kW, and spraying distance of 120 mm were applied. The porosity of the lower layer was determined by image analysis method as explained below, and was 2.0%.

Further, a slurry was prepared such that 30 wt % of yttrium fluoride particles having a BET specific surface area of 0.7 m$^2$/g and an average particle size ($D_{50}$) of 3.3 µm was dispersed in ethanol. A yttrium fluoride series sprayed coating of 150 µm thick was formed as a surface layer on the lower layer disposed on the substrate by using a suspension plasma spraying apparatus with the slurry. The outermost surface portion of the surface layer was machined by grinding to remove 50 µm-thick from the surface, and the surface was polished to a mirror surface having a surface roughness Ra of 0.1 µm. Then, a sample piece of an erosion-resistant coating having a double layer structure and a total thickness of 200 µm was prepared. The porosity of the surface layer was determined by image analysis method as explained below, and was 0.4%.

[Measurement of Porosity]

The sample piece was embedded into resin, cross-section surface was polished to mirror surface (surface roughness Ra: 0.1 µm). Then, electron microscopic pictures of the cross-section surface were taken (at 200 times magnification). The photographic images were taken at ten view fields (photographed area: 0.017 mm$^2$ per view field) of the cross-section surface. After the image was processed by utilizing image processing software "Photoshop" (produced by Adobe Systems Co., Ltd.), the porosity was quantified by utilizing image analysis software "Section Image" (produced by Scion Corporation), and the porosity was computed as the ratio of the total area of pore portions to the total area of the observed area. The porosity was evaluated as an average of ten view fields.

Example 2

An A5052 aluminum alloy substrate having the surface size of 100 mm square and 5 mm thick was degreased at the surface by acetone, and one surface of the substrate was subjected to roughening treatment with an abrasive corundum. An erbium oxide sprayed coating of 100 μm thick was formed as a lower layer on the substrate by using an atmospheric plasma spraying apparatus with an erbium oxide powder (granulated particles) having an average particle size ($D_{50}$) of 20 μm. As spraying conditions, argon gas and hydrogen gas were used as plasma gases, and output of 30 kW and spraying distance of 120 mm were applied. The porosity of the lower layer was determined by image analysis method as the same in Example 1, and was 3.2%.

Further, a slurry was prepared such that 30 wt % of erbium fluoride particles having a BET specific surface area of 1.5 $m^2/g$ and an average particle size ($D_{50}$) of 2.3 μm was dispersed in ethanol. An erbium fluoride series sprayed coating of 100 μm thick was formed as a surface layer on the lower layer composed of erbium oxide sprayed coating disposed on the substrate by using a suspension plasma spraying apparatus with the slurry. As spraying conditions, argon gas, nitrogen gas and hydrogen gas were used as plasma gases, and output of 100 kW, and spraying distance of 75 mm were applied. Then, a sample piece of an erosion-resistant coating having a double layer structure and a total thickness of 200 μm was prepared. The porosity of the surface layer was determined by image analysis method as the same in Example 1, and was 0.8%.

Example 3

An A5052 aluminum alloy substrate having the surface size of 100 mm square and 5 mm thick was degreased at the surface by acetone, and one surface of the substrate was subjected to roughening treatment with an abrasive corundum. A yttrium oxide sprayed coating of 100 μm thick was formed as a lower layer on the substrate by using an atmospheric plasma spraying apparatus with a yttrium oxide powder (granulated particles) having an average particle size ($D_{50}$) of 20 μm. As spraying conditions, argon gas and hydrogen gas were used as plasma gases, and output of 30 kW, and spraying distance of 120 mm were applied. The porosity of the lower layer was determined by image analysis method as the same in Example 1, and was 2.9%.

Further, a slurry was prepared such that 30 wt % of a mixture of yttrium fluoride particles having a BET specific surface area of 1.0 $m^2/g$ and an average particle size ($D_{50}$) of 3.7 μm, and yttrium oxide fine particles having a BET specific surface area of 48.3 $m^2/g$ and an average particle size ($D_{50}$) of 200 nm that contains them in the weight ratio of yttrium fluoride/yttrium oxide=99/1 was dispersed in ethanol. In this case, the content of the yttrium oxide fine particles in the slurry is 0.3 wt %. A yttrium fluoride series sprayed coating of 100 μm thick was formed as a surface layer on the lower layer composed of yttrium oxide sprayed coating disposed on the substrate by using a suspension plasma spraying apparatus with the slurry. As spraying conditions, argon gas, nitrogen gas and hydrogen gas were used as plasma gases, and output of 100 kW, and spraying distance of 75 mm were applied. Then, a sample piece of an erosion-resistant coating having a double layer structure and a total thickness of 200 μm was prepared. The porosity of the surface layer was determined by image analysis method as the same in Example 1, and was 0.2%.

Example 4

An A5052 aluminum alloy substrate having the surface size of 100 mm square and 5 mm thick was degreased at the surface by acetone, and one surface of the substrate was subjected to roughening treatment with an abrasive corundum. A yttrium oxide sprayed coating of 180 μm thick was formed as a lower layer on the substrate by using an atmospheric plasma spraying apparatus with a yttrium oxide powder (granulated particles) having an average particle size ($D_{50}$) of 30 μm. As spraying conditions, argon gas and hydrogen gas were used as plasma gases, and output of 30 kW and spraying distance of 120 mm were applied. The porosity of the lower layer was determined by image analysis method as the same in Example 1, and was 3.5%. The surface roughness Ra of the resulting coating was 5.6 μm. Next, the outermost surface portion of the yttrium oxide sprayed coating was machined by using a surface grinding machine, and the grinded surface was polished to a mirror surface having a surface roughness Ra of 0.1 μm. The thickness of the coating was adjusted to 100 μm.

Further, a slurry was prepared such that 30 wt % of yttrium fluoride particles having a BET specific surface area of 0.6 $m^2/g$ and an average particle size ($D_{50}$) of 4.6 μm was dispersed in ethanol. A yttrium fluoride series sprayed coating of 100 μm thick was formed as a surface layer on the lower layer composed of yttrium oxide sprayed coating disposed on the substrate by using a suspension plasma spraying apparatus with the slurry. As spraying conditions, argon gas, nitrogen gas and hydrogen gas were used as plasma gases, and output of 100 kW, and spraying distance of 75 mm were applied. Then, a sample piece of an erosion-resistant coating having a double layer structure and a total thickness of 200 μm was prepared. The porosity of the surface layer was determined by image analysis method as the same in Example 1, and was 0.9%.

Example 5

An A5052 aluminum alloy substrate having the surface size of 100 mm square and 5 mm thick was degreased at the surface by acetone, and one surface of the substrate was subjected to roughening treatment with an abrasive corundum. A yttrium oxide sprayed coating of 100 μm thick was formed as a lower layer on the substrate by using an atmospheric plasma spraying apparatus with a yttrium oxide powder (granulated particles) having an average particle size ($D_{50}$) of 18 μm. As spraying conditions, argon gas and hydrogen gas were used as plasma gases, and output of 30 kW, and spraying distance of 120 mm were applied. The porosity of the lower layer was determined by image analysis method as the same in Example 1, and was 2.9%.

Further, a yttrium fluoride series sprayed coating of 100 μm thick was formed as a surface layer on the lower layer disposed on the substrate by using an atmospheric plasma spraying apparatus with granulated particles containing 90 wt % of yttrium fluoride and 10 wt % of yttrium oxide, and having an average particle size ($D_{50}$) of 30 μm. As spraying conditions, argon gas and hydrogen gas were used as plasma gases, and output of 35 kW and spraying distance of 120 mm were applied. Then, a sample piece of an erosion-resistant coating having a double layer structure and a total thickness of 200 µm was prepared. The porosity of the surface layer was determined by image analysis method as the same in Example 1, and was 2.3%.

Example 6

An A5052 aluminum alloy substrate having the surface size of 100 mm square and 5 mm thick was degreased at the surface by acetone, and one surface of the substrate was subjected to roughening treatment with an abrasive corundum. A yttrium oxide sprayed coating of 50 µm thick was formed as a first layer on the substrate by using an atmospheric plasma spraying apparatus with a yttrium oxide powder (granulated particles) having an average particle size ($D_{50}$) of 20 µm. As spraying conditions, argon gas and hydrogen gas were used as plasma gases, and output of 30 kW, and spraying distance of 120 mm were applied. Next, a yttrium fluoride series sprayed coating of 50 µm thick was formed as a second layer on the first layer by using an atmospheric plasma spraying apparatus with granulated particles containing 90 wt % of yttrium fluoride and 10 wt % of yttrium oxide and having an average particle size ($D_{50}$) of 30 µm. As spraying conditions, argon gas and hydrogen gas were used as plasma gases, and output of 35 kW, and spraying distance of 120 mm were applied. Herein, a combined coating having a multilayer structure that consists of first and second layers was formed as a lower layer. The porosity of the lower layer was determined by image analysis method as the same in Example 1, and was 2.9%.

Further, a slurry was prepared such that 30 wt % of a mixture of yttrium fluoride particles having a BET specific surface area of 0.5 m$^2$/g and an average particle size ($D_{50}$) of 5.7 µm, and silicon carbide fine particles having an average particle size ($D_{50}$) of 2 µm that contains them in the weight ratio of yttrium fluoride/silicon carbide=95:5 was dispersed in ethanol. In this case, the content of the silicon carbide fine particles in the slurry is 1.5 wt %. A yttrium fluoride series sprayed coating of 150 µm thick was formed as a surface layer on the lower layer of the coating having a multilayer structure by using a suspension plasma spraying apparatus with the slurry. As spraying conditions, argon gas, nitrogen gas and hydrogen gas were used as plasma gases, and output of 100 kW, and spraying distance of 75 mm were applied. Then, a sample piece of an erosion-resistant coating having a triple layer structure and a total thickness of 250 µm was prepared. The porosity of the surface layer was determined by image analysis method as the same in Example 1, and was 0.3%.

Example 7

An A5052 aluminum alloy substrate having the surface size of 100 mm square and 5 mm thick was degreased at the surface by acetone, and one surface of the substrate was subjected to roughening treatment with an abrasive corundum. A gadolinium oxide sprayed coating of 300 µm thick was formed as a lower layer on the substrate by using an atmospheric plasma spraying apparatus with a gadolinium oxide powder (granulated particles) having an average particle size ($D_{50}$) of 15 µm. As spraying conditions, argon gas and hydrogen gas were used as plasma gases, and output of 30 kW, and spraying distance of 120 mm were applied. The porosity of the lower layer was determined by image analysis method as the same in Example 1, and was 2.2%.

Further, a slurry was prepared such that 30 wt % of a mixture of gadolinium fluoride particles having a BET specific surface area of 0.3 m$^2$/g and an average particle size ($D_{50}$) of 5.9 µm, and silicon carbide fine particles having an average particle size ($D_{50}$) of 2 µm that contains them in the weight ratio of gadolinium fluoride/silicon carbide=90:10 was dispersed in ethanol. In this case, the content of the silicon carbide fine particles in the slurry is 3 wt %. A gadolinium fluoride series sprayed coating of 50 µm thick was formed as a surface layer by using a suspension plasma spraying apparatus with the slurry. As spraying conditions, argon gas, nitrogen gas and hydrogen gas were used as plasma gases, and output of 100 kW, and spraying distance of 75 mm were applied. Then, a sample piece of an erosion-resistant coating having a double layer structure and a total thickness of 350 µm was prepared. The porosity of the surface layer was determined by image analysis method as the same in Example 1, and was 0.1%.

Comparative Example 1

An A5052 aluminum alloy substrate having the surface size of 100 mm square and 5 mm thick was degreased at the surface by acetone, and one surface of the substrate was subjected to roughening treatment with an abrasive corundum. An alumina sprayed coating of 200 µm thick was formed on the substrate by using an atmospheric plasma spraying apparatus with an alumina powder (Sumicorundum AA-18) having an average particle size ($D_{50}$) of 18 µm. As spraying conditions, argon gas and hydrogen gas were used as plasma gases, and output of 30 kW, and spraying distance of 120 mm were applied. Then, a sample piece of an erosion-resistant coating composed of an alumina sprayed coating was prepared. The porosity of the alumina sprayed coating was determined by image analysis method as the same in Example 1, and was 3.5%.

Comparative Example 2

An A5052 aluminum alloy substrate having the surface size of 100 mm square and 5 mm thick was degreased at the surface by acetone, and one surface of the substrate was subjected to roughening treatment with an abrasive corundum. A yttrium oxide sprayed coating of 200 µm thick was formed on the substrate by using an atmospheric plasma spraying apparatus with a yttrium oxide powder (granulated particles) having an average particle size ($D_{50}$) of 30 µm. As spraying conditions, argon gas and hydrogen gas were used as plasma gases, and output of 30 kW and spraying distance of 120 mm were applied. Then, a sample piece of an erosion-resistant coating composed of an yttrium oxide sprayed coating was prepared. The porosity of the alumina sprayed coating was determined by image analysis method as the same in Example 1, and was 1.8%.

Comparative Example 3

An A5052 aluminum alloy substrate having the surface size of 100 mm square and 5 mm thick was degreased at the surface by acetone, and one surface of the substrate was subjected to roughening treatment with an abrasive corundum. A slurry was prepared such that 30 wt % of yttrium fluoride particles having a BET specific surface area of 2.8 m$^2$/g and an average particle size ($D_{50}$) of 1.6 µm was dispersed in pure water containing 10 wt % of ethanol. A yttrium fluoride series sprayed coating of 100 µm thick was formed by using a suspension plasma spraying apparatus with the slurry. As spraying conditions, argon gas, nitrogen gas and hydrogen gas were used as plasma gases, and output of 100 kW, and spraying distance of 75 mm were applied.

Then, a sample piece of an erosion-resistant coating consisting of a single layer was prepared. The porosity of the yttrium fluoride sprayed coating was determined by image analysis method as the same in Example 1, and was 3.5%.

With respect to the erosion-resistant coating of the sample pieces of Examples 1 to 7 and Comparative Example 1 to 3, crystal phase, Vickers hardness, amount of particles generated, erosion resistivity to plasma, thickness, centerline average roughness (surface roughness) Ra, and concentrations of rare earth element (R), oxygen (O) and nitrogen (N) were measured in each of the sprayed coating by the following respective methods. The results are shown in Table 1.

[Measurement of Crystal Phase]
The crystal phase contained in the erosion resistant coating of the obtained sample piece was identified by X-ray diffractometer "X'Pert Pro/MPD", manufactured by Malvern Panalytical Ltd.

[Measurement of Thickness]
The thickness of the obtained sample piece was measured by Eddy-current Coating Thickness Tester, LH-300J, manufactured by Kett Electric Laboratory.

[Measurement of Vickers Hardness]
The surface of coating was polished to mirror surface (surface roughness Ra=0.1 μm), and the Vickers hardness of the obtained sample piece was measured at the surface of the coating by a micro Vickers hardness tester, AVK-C1, manufactured by Mitutoyo Corporation (loading: 300 gf (2.94 N), loading time: 10 min). The Vickers hardness was evaluated as an average of five points.

[Test for Evaluation of Particle Generation]
The obtained sample piece was cleared by ultrasonic cleaning (power: 200W, cleaning time: 30 min), then dried, and the sample piece was immersed into 20 cc of pure water, and further cleaned by ultrasonic cleaning. After the cleaning, the sample piece was removed from the treated water, and 2 cc of 5.3N nitric acid aqueous solution was added into the treated water to solve $R_2O_3$ fine particles included in the treated water, then $R_2O_3$ was quantified by inductively-coupled plasma emission spectrometry.

[Test for Evaluation of Erosion-Resistance]
The surface of the obtained sample piece was polished to a mirror surface having a surface roughness Ra of 0.1 μm, and a part of the surface was cover with a masking tape to form a portion covered with the masking tape, and a portion for exposure. The sample piece was set in a reactive plasma etching apparatus, then, a test for erosion-resistance to plasma was conducted under the conditions of plasma output of 440 W, gas species of $CF_3$ and $O_2$(20 vol %), flow rate of 20 sccm, gas pressure of 5 Pa, and test time of 8 hours. The height of the step formed between the covered portion and the exposed portion due to erosion was measured by surface profile measuring system "Dektak3030". The result was evaluated as an average of four measured points.

[Measurement of Centerline Average Roughness (Surface Roughness) Ra]
The roughness Ra of the obtained sprayed coating was measured by surface texture measuring instrument, HANDYSURF E-35A, manufactured by Tokyo Seimitsu Co., Ltd.

[Measurement of Constituent Elements]
The obtained sprayed coating was peeled from the substrate on which the sprayed coating disposed, and the surface layer of the coating was provided to measurement of constituent elements. R concentration was measured by EDTA titration method, O concentration was measured by inert gas fusion infrared absorption spectrophotometry, and F concentration was NaOH fusion IC method.

TABLE 1

|  |  | Example | | | | | | | Comparative Example | | |
|---|---|---|---|---|---|---|---|---|---|---|---|
|  |  | 1 | 2 | 3 | 4 | 5 | 6 | 7 | 1 | 2 | 3 |
| Surface Layer | Spraying Method for Surface Layer | SPS | SPS | SPS | SPS | APS | SPS | SPS | APS | APS | SPS |
|  | Crystal Phase | $YF_3$ YOF | $ErF_3$ ErOF | $YF_3$ $Y_5O_4F_7$ | $YF_3$ YOF | $Y_5O_4F_7$ | $YF_3$ YOF | $GdF_3$ $Gd_5O_4F_7$ | $Al_2O_3$ | $Y_2O_3$ | $YF_3$ $Y_5O_4F_7$ YOF |
|  | Coating Thickness (μm) | 100 | 100 | 100 | 100 | 100 | 150 | 50 | 200 | 200 | 100 |
|  | Vickers Hardness | 590 | 560 | 530 | 510 | 360 | 530 | 520 | 800 | 450 | 390 |
|  | Porosity (%) | 0.4 | 0.8 | 0.2 | 0.9 | 2.3 | 0.3 | 0.1 | 3.5 | 1.8 | 3.5 |
|  | Amount of R Particles (μg/cm$^2$) | 1.8 | 0.9 | 0.2 | 0.4 | 5.2 | 0.8 | 1.1 | — | 7.3 | 9.4 |
|  | Erosion Resistivity (Average Height of Step) (μm) | 2.5 | 2.9 | 3.3 | 2.8 | 4.3 | 3.8 | 3.9 | 7.7 | 1.9 | 3.5 |
|  | Surface Roughness Ra (μm) | 0.1 | 4.7 | 4.5 | 1.4 | 4.3 | 0.9 | 2.4 | 3.9 | 4.9 | 11.8 |
|  | Concentration of R (wt %) | 64.7 | 64.5 | 64.2 | 63.3 | 65.5 | 61.5 | 68.6 | — | 78.7 | 63.4 |
|  | Concentration of O (wt %) | 3.7 | 4.6 | 3.7 | 3.0 | 5.8 | 3.5 | 2.5 | 47.0 | 21.3 | 3.2 |
|  | Concentration of F (wt %) | 30.4 | 30.1 | 31.6 | 33.0 | 26.5 | 28.9 | 18.9 | — | — | 31.4 |
| Lower Layer | Spraying Method for Lower Layer | APS | APS | APS | APS | APS | APS | APS | — | — | — |
|  | Crystal Phase | $Y_2O_3$ | $Er_2O_3$ | $Y_2O_3$ | $Y_2O_3$ | $Y_2O_3$ | $YF_3$ $Y_2O_3$ | $Gd_2O_3$ | — | — | — |
|  | Coating Thickness (μm) | 100 | 100 | 100 | 100 | 100 | 50 50 | 300 | — | — | — |
|  | Surface Roughness Ra (μm) | 5.8 | 3.1 | 4.0 | 0.1 | 4.5 | 4.8 | 4.2 | — | — | — |
|  | Porosity (%) | 2.0 | 3.2 | 2.9 | 3.5 | 2.9 | 2.9 | 2.2 | — | — | — |

Further, electric performances of each of the erosion-resistant coatings of Examples 1 to 7 and Comparative Examples 1 to 3 were investigated by the following methods. Three test pieces (N=3) were prepared for the test of electric performances, and a volume resistivity, a surface resistivity and a dielectric breakdown voltage at room temperature (23° C.) and 200° C. were investigated in each of the three pieces, respectively. The results are shown in Tables 2 to 4.

[Method for Measuring Volume Resistivity]

Volume resistances at room temperature (23° C.) and 200° C. were measured by ultrahigh resistance/minimal current digital meter "Type 8340A" (manufactured by ADC Corporation) in conformity with Standard Test Method (ASTM D257:2007), and a volume resistivity was computed based on the thickness. The result was evaluated as an average of three test pieces (N=3). The "temperature index" in Table 2 means a value calculated by the expression: (Volume resistivity at 200° C.)/(Volume resistivity at 23° C.). When the temperature index is closer to 1 (one), volume resistivity of the erosion-resistant coating is maintained regardless of temperature variation, and such a temperature index means that the erosion-resistant has resistance to temperature variation.

[Method for Measuring Surface Specific Resistance]

Surface resistances at room temperature (23° C.) and 200° C. were measured by ultrahigh resistance/minimal current digital meter "Type 8340A" (manufactured by ADC Corporation) in conformity with Standard Test Method (ASTM D257:2007), and a surface resistivity was computed. The result was evaluated as an average of three test pieces (N=3).

[Method for Measuring Dielectric Breakdown Voltage]

Dielectric breakdown voltages at room temperature (23° C.) and 200° C. were measured by dielectric breakdown tester "Type HAT-300-100RHO" (manufactured by Yamasaki Sangyo Kabushiki Kaisha) in conformity with Standard Test Method (ASTM D149:2009), and a dielectric breakdown strength was computed based on the thickness. The result was evaluated as an average of three test pieces (N=3).

TABLE 2

[Volume Resistivity]

| | Volume Resistivity ($\Omega \cdot cm$) | | Temperature Index |
|---|---|---|---|
| | at 23° C. | at 200° C. | |
| Example 1 | $1.45 \times 10^{10}$ | $8.97 \times 10^{10}$ | 6.2 |
| Example 2 | $1.01 \times 10^{11}$ | $3.23 \times 10^{11}$ | 3.2 |
| Example 3 | $1.35 \times 10^{11}$ | $2.83 \times 10^{11}$ | 2.1 |
| Example 4 | $2.10 \times 10^{11}$ | $1.20 \times 10^{11}$ | 0.6 |
| Example 5 | $5.37 \times 10^{9}$ | $1.23 \times 10^{9}$ | 0.2 |
| Example 6 | $1.00 \times 10^{12}$ | $1.03 \times 10^{11}$ | 0.1 |
| Example 7 | $1.82 \times 10^{11}$ | $1.83 \times 10^{12}$ | 10.0 |
| Comparative Example 1 | $1.37 \times 10^{9}$ | $2.20 \times 10^{14}$ | 160975.6 |
| Comparative Example 2 | $2.40 \times 10^{10}$ | $1.16 \times 10^{13}$ | 483.3 |
| Comparative Example 3 | $2.70 \times 10^{11}$ | $2.06 \times 10^{9}$ | 0.008 |

TABLE 3

[Surface Specific Resistance]

| | Surface Resistivity ($\Omega$) | |
|---|---|---|
| | at 23° C. | at 200° C. |
| Example 1 | $4.49 \times 10^{12}$ | $6.57 \times 10^{10}$ |
| Example 2 | $5.00 \times 10^{14}$ | $4.23 \times 10^{12}$ |

TABLE 3-continued

[Surface Specific Resistance]

| | Surface Resistivity ($\Omega$) | |
|---|---|---|
| | at 23° C. | at 200° C. |
| Example 3 | $1.02 \times 10^{14}$ | $9.95 \times 10^{11}$ |
| Example 4 | $1.79 \times 10^{15}$ | $4.73 \times 10^{9}$ |
| Example 5 | $5.77 \times 10^{12}$ | $1.18 \times 10^{14}$ |
| Example 6 | $3.73 \times 10^{14}$ | $6.63 \times 10^{9}$ |
| Example 7 | $7.00 \times 10^{13}$ | $5.53 \times 10^{9}$ |
| Comparative Example 1 | $7.70 \times 10^{11}$ | $1.97 \times 10^{15}$ |
| Comparative Example 2 | $4.87 \times 10^{12}$ | $2.33 \times 10^{15}$ |
| Comparative Example 3 | $4.93 \times 10^{15}$ | $2.00 \times 10^{14}$ |

TABLE 4

[Dielectric Breakdown Voltage]

| | Dielectric Breakdown Strength (kV/mm) | |
|---|---|---|
| | at 23° C. | at 200° C. |
| Example 1 | 12.0 | 17.2 |
| Example 2 | 15.4 | 9.7 |
| Example 3 | 17.5 | 14.3 |
| Example 4 | 20.3 | 15.5 |
| Example 5 | 20.6 | 15.0 |
| Example 6 | 18.0 | 15.0 |
| Example 7 | 17.9 | 14.9 |
| Comparative Example 1 | 24.7 | 13.5 |
| Comparative Example 2 | 17.4 | 14.4 |
| Comparative Example 3 | 17.9 | 10.3 |

As shown in Tables 1 and 2, the erosion-resistant coating of the invention having a multilayer structure that consists of a rare earth oxide coating, and a rare earth fluoride series coating formed thereon has a temperature index of 0.1 to 10. It is confirmed that variation of the volume resistivity in the temperature range from 23 to 200° C. is almost maintained. That is to say, in the erosion-resistant coating of the invention, variation of the volume resistivity between 23° C. and 200° C. is very small, thus, the invention can provide an erosion-resistant coating being stable in electric performances. The temperature index of volume resistivities can be arbitrarily controlled by variation of thicknesses of the lower and surface layers, and/or variation of oxygen content of rare earth fluoride series coating of the surface layer. For Example, a material having a small variation of the volume resistivity between a room temperature and the high temperature of 200° C. is required for an electrostatic chuck used in a plasma etching apparatus. It is confirmed that the invention is a material satisfying the requirement from the results. The erosion-resistant coating of the invention has a stable and sufficient surface resistivity to temperature variation, as shown in Table 3. Further, the erosion-resistant coatings in Examples 1 to 7 of the invention have a sufficiently high dielectric breakdown strength as shown in Table 4. It is confirmed the erosion-resistant coating has a dielectric breakdown voltage applicable for a material of an electrostatic chuck.

As shown in Table 1, the surface layer which constituents the sprayed coating of each of Example 1-4, 6 and 7 was obtained by suspension plasma slurry (SPS) method with a slurry including an organic solvent (ethanol) only as a dispersion medium, and includes crystal phases consisting of a rare earth fluoride and a rare earth oxyfluoride. These have a higher Vickers hardness in comparison with Comparative Example 3 in which mostly of the dispersion medium is water, and are dense coatings having a low porosity. It is confirmed generation of particles is reduced in the invention and the sprayed coating has an excellent erosion-resistance.

Figure 1:
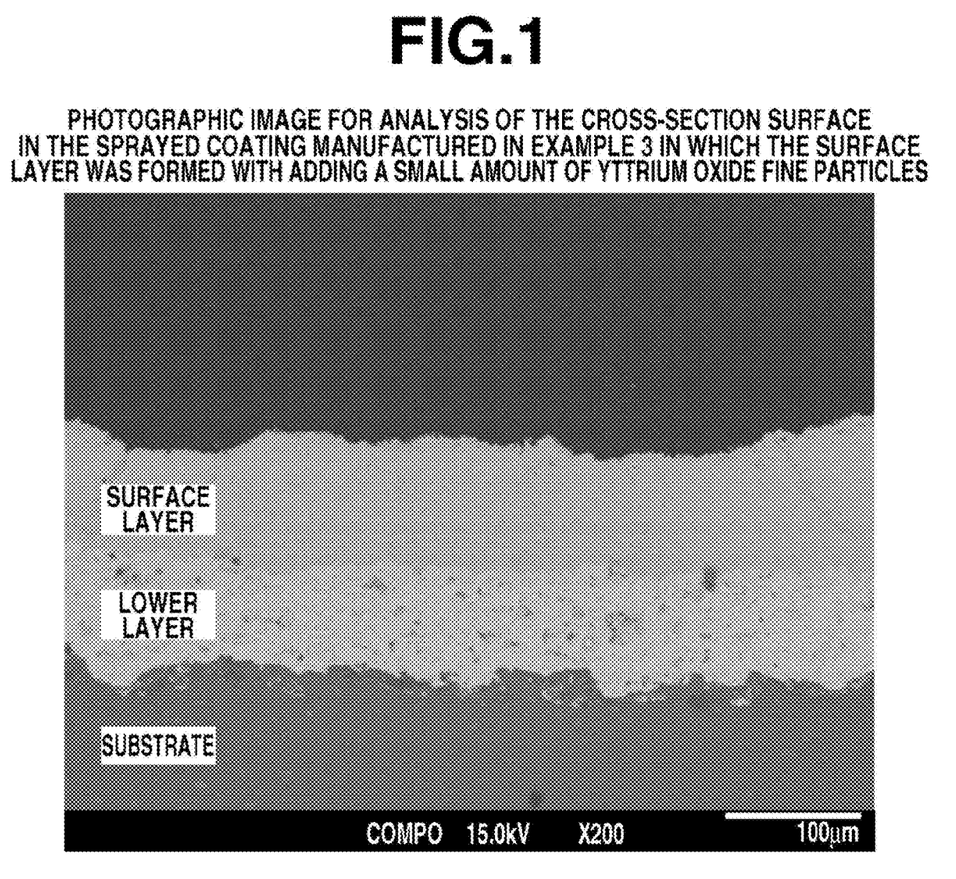
FIG. 1 is a photographic image for analysis of the cross-section surface in the sprayed coating manufactured in Example 3 in which the surface layer was formed with adding a small amount of yttrium oxide fine particles.
Figure 2:
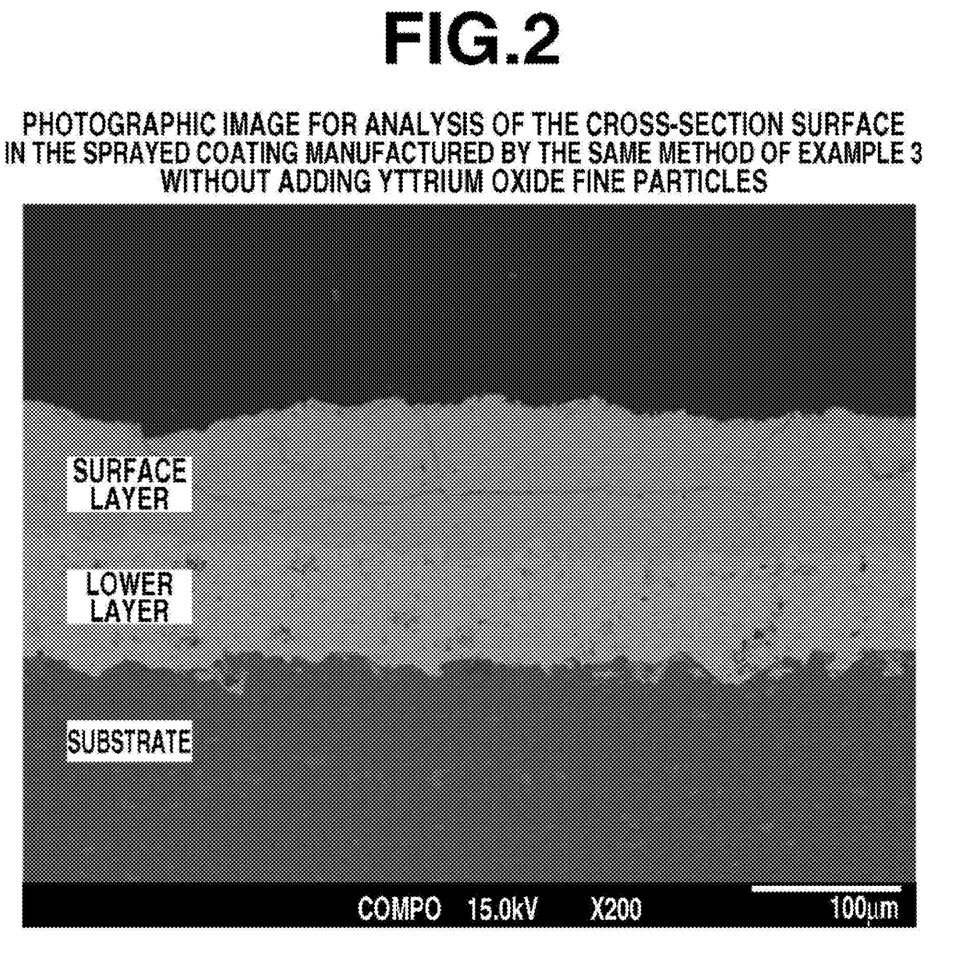
FIG. 2 is a photographic image for analysis of the cross-section surface in the sprayed coating manufactured by the same method of Example 3 without adding yttrium oxide fine particles.

Next, in Example 3, the surface layer of the sprayed coating was formed by suspension slurry spraying with a slurry including yttrium fluoride particles in which yttrium oxide fine particles ($D_{50}$: 50 nm) were added. The effect of the addition of the yttrium oxide fine particles was confirmed by observing and comparing a cross-section surface of the surface layer in the sprayed coating of Example 3, with a cross-section surface of a sprayed coating that was formed by the same method except for excluding addition of the yttrium oxide fine particle, though an electron microscope. The results are shown in FIGS. 1 and 2. As shown in FIGS. 1 and 2, it is confirmed that generation of lateral cracks in a cross-section surface of the surface layer of the sprayed coating was effectively suppressed in the coating of the surface layer obtained with a slurry which was added a small amount of the yttrium oxide fine particles in comparison with the coating obtained with a slurry which was added no yttrium oxide fine particles.

[Preparation of Rare Earth Fluoride Particles for Forming a Surface Layer in Examples 1-4, 6 and 7]

The rare earth fluoride particles for forming a surface layer in Examples 1-4, 6 and 7 were prepared by the following method. First, a solution including a rare earth nitrate was heated to 50° C., and a solution of ammonium fluoride was added into the solution including a rare earth nitrate, then the solution was mixed with stirring at 50° C. for 30 min. As a result, a white precipitate was crystallized. After that, the precipitate was filtrated, washed with water, and dried. The resulting precipitate was identified, by of X-ray diffraction analysis, as an ammonium fluoride double salt in form of $R_3(NH_4)F_{10}$, wherein R is a rare earth element (i.e., Y in Examples 1, 3, 4 and 6, Er in Example 2, or Gd in Example 7). Further, the double salt was fired under nitrogen atmosphere at 900° C. in Examples 6 and 7, at 875° C. in Example 4, at 850° C. in Examples 1 and 3, or at 825° C. in Example 2. The fired product was pulverized by a jet mill, then, the rare earth fluoride particles were obtained.

[Preparation of Yttrium Fluoride Particles for Forming a Surface Layer in Comparative Example 3]

The yttrium fluoride particles for forming a surface layer in Comparative Example 3 were prepared by the following method. First, a yttrium oxide powder and an ammonium hydrogenfluoride powder were mixed. The mixture was fired under nitrogen atmosphere at 650° C. for 2 hours, then, yttrium fluoride was obtained. The obtained yttrium fluoride was pulverized by a jet mill, and sifted by air classification, then, rare earth fluoride particles were obtained.

With respect to the rare earth compound powder (yttrium fluoride particles, erbium fluoride particles or gadolinium fluoride) prepared by the above-described method, and used for preparing the slurry for thermal spraying (spraying material) in each of Examples 1-4, 6 and 7 and Comparative Example 3, BET specific surface area, average particle size $D_{50}$, average roundness, particle hardness and pore volume were measured by the following respective methods. The results are shown in Table 5.

[Measurement of BET Specific Surface Area]

The BET specific surface area of the obtained rare earth compound powder was measured by Full Automatic BET Specific Surface Area Analyzer, Macsorb HM model-1208, manufactured by Mountech Co., Ltd.

[Measurement of Average Particle Size $D_{50}$]

Particle size distribution of the rare earth compound powder was measured by laser diffraction method and the average particle size $D_{50}$ was evaluated in volume basis. For the measurement, a laser diffraction/scattering type particle size distribution measuring apparatus "Microtrac MT3300EX II", manufactured by MicrotracBEL Corp., was used. The obtained slurry (in Example 1 to 4, 6 or 7 or Comparative Example 3) was added into 30 ml of pure water, irradiated with ultrasonic (40 W, 1 min), and then provided to evaluation as a sample. The obtained powder (in Example 5 or Comparative Example 1 or 2) was added into 30 ml of pure water, and then directly provided to evaluation as a sample. The sample was dropped into the circulation system of the measuring apparatus so as to be adjusted to Concentration Index DV (Diffraction Volume) of 0.01 to 0.09 that adopts to the specification of the measuring apparatus, and the measurement was subjected.

[Measurement of Average Roundness]

An average roundness is an evaluated value for circularity of spraying particles defined by the expression:

(Roundness)=(Circumferential length of an assumed circle having the equivalent area in planar view to an area of an observed particle)/(Circumferential length of the observed particle in planar view).

The average roundness of the obtained rare earth compound powder was measured by "FPIA-3000S", manufactured by Sysmex Corporation. In particular, a flat sample flow of a sample of slurry was formed by a sheath fluid, and a still image of particles was taken under strobe illumination by a flat sheath flow method using Flow particle image analyzer "FPIA-3000S". The average roundness was measured by analyzing each of the sampled particles by image analysis technique. Specifically, 20 mg of a sample powder was added into a beaker, a particle sheath, as an aqueous solution of dispersing agent (manufactured by Sysmex Corporation) was added into the beaker to fix the volume of the mixture to 20 ml, then, the slurry was dispersed by ultrasonic (100 W) for 2 min. The measurement was conducted with the obtained slurry for the measurement.

[Measurement of Particle Hardness]

The particle hardness of the obtained rare earth compound powder was measured by nanoindentation method. "ENT-2100", manufactured by Elionix Inc. was utilized for as an analysis apparatus.

The nanoindentation method is a technique that measures mechanical properties such as hardness of material, elastic modulus (physical property value indicating difficulty of plastic deformation) and yield stress (stress at which a substance starts plastic deformation), on nanometer scale. The diamond indenter is pressed into a sample powder placed on a stage, load (pressing strength) and deformation (pressing depth) are measured, and mechanical properties are calculated from the obtained load-deformation curve. The measuring apparatus includes a diamond indenter, a transducer and a controller for detecting control and measurement values of the diamond indenter, and a computer for operation.

[Measurement of Pore Volume]

The pore volume of the rare earth compound powder was measured by mercury porosimetry with Mercury Porosimeter, AutoPore III, manufactured by Micromeritics Instrument Corporation, and from the obtained cumulative pore volume distribution relative to the pore diameter, total volume of pores having a diameter of up to 10 μm was computed.

TABLE 5

|  | Example | | | | | | | Comparative Example | | |
| --- | --- | --- | --- | --- | --- | --- | --- | --- | --- | --- |
|  | 1 | 2 | 3 | 4 | 5 | 6 | 7 | 1 | 2 | 3 |
| Raw Material Powder | $YF_3$ | $ErF_3$ | $YF_3$ | $YF_3$ | $YF_3$ + $Y_2O_3$ | $YF_3$ | $GdF_3$ | $Al_2O_3$ | $Y_2O_3$ | $YF_3$ |
| Dispersion Medium | Ethanol | Ethanol | Ethanol | Ethanol | — | Ethanol | Ethanol | — | — | Pure Water + Ethanol |
| Additive (Fine Particles) | — | — | $Y_2O_3$ | — | — | SiC | SiC | — | — | — |
| BET Specific Surface Area (m$^2$/g) | 0.7 | 1.5 | 1.0 | 0.6 | — | 0.5 | 0.3 | — | — | 2.8 |
| Average Particle Size $D_{50}$ (μm) | 3.3 | 2.3 | 3.7 | 4.6 | 30 | 5.7 | 5.9 | 18 | 30 | 1.6 |
| Average Roundness | 0.93 | 0.91 | 0.93 | 0.90 | — | 0.92 | 0.92 | — | — | 0.84 |
| Particle Hardness (GPa) | 9.12 | 9.40 | 9.90 | 8.23 | — | 7.58 | 11.34 | — | — | 6.32 |
| Volume of Pore Having Diameter of up to 10 μm (cm$^3$/g) | 0.31 | 0.27 | 0.26 | 0.23 | — | 0.19 | 0.14 | — | — | 0.56 |

As shown in Table 5, in case that the surface layer formed by SPS method, it is confirmed that a dense sprayed coating having a very high hardness and being superior in erosion-resistance, as shown in Table 1, was obtained by the SPS method with a slurry including a rare earth compound powder dispersed in an organic solvent. In this case, use of a rare earth fluoride powder having a BET surface area of up to 2 m$^2$/g and an average particle size $D_{50}$ of 2 to 6 μm, and further having an average roundness of at least 0.9, a particle hardness of 7 to 12 GPa, and a total volume of pore having a diameter of up to 10 μm of up to 0.5 cm$^3$/g, as the rare earth compound powder, is more preferably for forming the advantageous sprayed coating. On the other hand, in case that the surface layer formed by APS method, it is confirmed that a sprayed coating having a very small variation of the volume resistivity, stable electrical characteristics, and a sufficient high dielectric breakdown voltage was obtained.

Japanese Patent Application No. 2018-152883 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A sprayed coating having a multilayer structure comprising a lower layer made of a sprayed coating comprising a rare earth oxide, and a surface layer made of another sprayed coating comprising a rare earth fluoride and/or a rare earth oxyfluoride, wherein
said sprayed coating having the multilayer structure has a volume resistivity at 23° C. and a volume resistivity at 200° C., the volume resistivity at 23° C. being 1×10$^9$ to 1×10$^{12}$ Ω·cm, and a temperature index of the volume resistivities defined by the ratio of the volume resistivity at 200° C. to the volume resistivity at 23° C. being 0.1 to 10.

2. The sprayed coating of claim 1 wherein the surface layer comprises $RF_3$, or $RF_3$ and at least one selected from the group consisting of $R_5O_4F_7$, $R_7O_6F_9$, and ROF, wherein R is at least one selected from rare earth elements inclusive of Y and Sc, and each R may be the same or different.

3. The sprayed coating of claim 1 wherein the lower layer comprises $R_2O_3$, or $R_2O_3$ and at least one selected from the group consisting of $RF_3$, $R_5O_4F_7$, $R_7O_6F_9$, and ROF, wherein R is at least one selected from rare earth elements inclusive of Y and Sc, and each R may be the same or different.

4. The sprayed coating of claim 1 wherein the lower layer has a multilayer structure consisting of at least two sub-layers of sprayed coatings, and at least one of the sub-layer consists of a sprayed coating comprising a rare earth oxide.

5. The sprayed coating of claim 1 wherein the lower layer has a thickness of 50 to 300 μm, and the surface layer has a thickness of 10 to 200 μm.

6. The sprayed coating of claim 1 wherein the surface layer has a Vickers hardness of at least 500.

7. The sprayed coating of claim 1 wherein the surface layer has a porosity of up to 1%.

8. The sprayed coating of claim 1 wherein the surface layer has a centerline average roughness Ra of 0.1 to 6 μm.

9. A sprayed member comprising a metal substrate, a ceramic substrate or a carbon substrate, and the sprayed coating of claim 1 formed thereon.

10. The sprayed member of claim 9 wherein the metal substrate is composed of an aluminum alloy, an anodized aluminum alloy or a stainless steel, the ceramic substrate is composed of alumina, zirconia, quartz glass, silicon carbide or silicon nitride.

11. A method for manufacturing the sprayed coating of claim 1, comprising the steps of:
thermal spraying a rare earth oxide powder on a substrate to form the lower layer by atmospheric plasma spraying, and
thermal spraying a slurry comprising an organic solvent and a rare earth fluoride powder dispersed therein on the lower layer to form the surface layer by suspension plasma spraying.

12. The method of claim 11 wherein the slurry further comprises a rare earth oxide powder, and a weight ratio of fluoride powder/oxide powder is 99/1 to 90/10.

13. A method for manufacturing the sprayed coating of claim 1, comprising the steps of:
thermal spraying a rare earth oxide powder on a substrate to form the lower layer by atmospheric plasma spraying, and
thermal spraying a powder comprising a rare earth fluoride and a rare earth oxide to the lower layer to form the surface layer by atmospheric plasma spraying.

14. A spraying material in a form of a slurry comprising an organic solvent and a rare earth compound powder dispersed therein, the rare earth compound powder comprising an RF$_3$ powder, and R being at least one selected from rare earth elements inclusive of Y and Sc, wherein the RF$_3$ powder has an average value of roundnesses of at least 0.9, the roundness being defined by the following expression (1):

(Roundness)=(Circumferential length of an assumed circle having the equivalent area in planar view to an area of an observed particle)/(Circumferential length of the observed particle in planar view)  (1).

15. The spraying material of claim 14 wherein the RF$_3$ powder has a BET specific surface area of up to 2 m$^2$/g, and a volume basis average particle size D$_{50}$ of 2 to 6 μm.

16. The spraying material of claim 14 wherein the RF$_3$ powder has a particle hardness of 7 to 12 GPa as measured by nanoindentation method.

17. The spraying material of claim 14 wherein the RF$_3$ powder has a total volume of pores having a diameter of up to 10 μm in the range of up to 0.5 cm$^3$/g as measured by mercury porosimetry.

18. A spraying material in a form of a slurry comprising an organic solvent and a rare earth compound powder dispersed therein, the rare earth compound powder comprising an RF$_3$ powder, and R being at least one selected from rare earth elements inclusive of Y and Sc, wherein the spraying material further comprises an R$_2$O$_3$ powder, R being at least one selected from rare earth elements inclusive of Y and Sc, and a weight ratio of RF$_3$ powder/R$_2$O$_3$ powder is 99/1 to 90/10.

19. The spraying material of claim 18 wherein the R$_2$O$_3$ powder has a volume basis average particle size D$_{50}$ of 10 to 500 nm.

20. The spraying material of claim 18 wherein the RF$_3$ powder has a BET specific surface area of up to 2 m$^2$/g, and a volume basis average particle size D$_{50}$ of 2 to 6 μm.

21. The spraying material of claim 18 wherein the RF$_3$ powder has an average value of roundnesses of at least 0.9, the roundness being defined by the following expression (1):

(Roundness)=(Circumferential length of an assumed circle having the equivalent area in planar view to an area of an observed particle)/(Circumferential length of the observed particle in planar view)  (1).

22. The spraying material of claim 18 wherein the RF$_3$ powder has a particle hardness of 7 to 12 GPa as measured by nanoindentation method.

23. The spraying material of claim 18 wherein the RF$_3$ powder has a total volume of pores having a diameter of up to 10 μm in the range of up to 0.5 cm$^3$/g as measured by mercury porosimetry.

* * * * *